(12) United States Patent
Kim et al.

(10) Patent No.: US 8,866,857 B2
(45) Date of Patent: Oct. 21, 2014

(54) APPARATUS AND METHOD FOR CONTROLLING WHITE BALANCE OF LASER DISPLAY SYSTEM

(75) Inventors: Yong Ki Kim, Seoul (KR); Jung Hoon Seo, Seoul (KR)

(73) Assignee: LG Electronics Inc., Seoul (KR)

(*) Notice: Subject to any disclaimer, the term of this patent is extended or adjusted under 35 U.S.C. 154(b) by 980 days.

(21) Appl. No.: 12/999,152

(22) PCT Filed: Jul. 20, 2009

(86) PCT No.: PCT/KR2009/003997
§ 371 (c)(1),
(2), (4) Date: Dec. 15, 2010

(87) PCT Pub. No.: WO2010/013907
PCT Pub. Date: Feb. 4, 2010

(65) Prior Publication Data
US 2011/0109667 A1 May 12, 2011

(30) Foreign Application Priority Data
Jul. 29, 2008 (KR) .................. 10-2008-0074007

(51) Int. Cl.
*G09G 5/10* (2006.01)
*H04N 9/73* (2006.01)
*H04N 9/31* (2006.01)

(52) U.S. Cl.
CPC ............... *H04N 9/73* (2013.01); *H04N 9/3155* (2013.01); *H04N 9/3129* (2013.01); *H04N 9/3182* (2013.01); *H04N 9/3161* (2013.01)
USPC .................. 345/690; 345/76; 345/82; 345/84

(58) Field of Classification Search
CPC ..... H04N 9/73; H04N 9/3182; H04N 9/3129; H04N 9/3161; H04N 9/3155
USPC .................. 345/76–111, 690–699
See application file for complete search history.

(56) References Cited

U.S. PATENT DOCUMENTS

2004/0223007 A1* 11/2004 Mamata ................. 345/690
2009/0206236 A1* 8/2009 Kawashima et al. ........ 250/205

FOREIGN PATENT DOCUMENTS

| JP | 2000-112429 A | 4/2000 |
| JP | 2006-252777 A | 9/2006 |
| JP | 2008-3257 A | 1/2008 |
| KR | 2001-0106932 A | 12/2001 |

* cited by examiner

*Primary Examiner* — Michael Pervan
(74) *Attorney, Agent, or Firm* — Birch, Stewart, Kolasch & Birch, LLP (57) ABSTRACT

The present invention relates to device and method for adjusting white balance in a laser display system, which enables to adjust white balance taking an optical characteristic of a laser beam into account. The device for adjusting white balance in a laser display system, having red, green, and blue laser beam sources, includes a temperature sensing unit for sensing the present temperatures of the laser beam sources, a detecting unit for measuring laser beam output intensity of the laser beam sources, a storing unit for storing reference values on allowable current ranges at different temperatures and laser beam output intensity at different temperatures, an adjusting value generating unit for comparing a measured value of the laser beam output intensity obtained from the detecting unit to the reference values obtained from the storing unit, to generate an adjusting value, a laser beam source driving unit for adjusting the laser beam output intensity of a relevant laser beam source according to a current value within the allowable current range or the adjusting value generated thus, and a control unit for searching the storing unit for the allowable current range corresponding to the present temperature sensed thus, or the reference value corresponding to the laser beam output intensity measured thus to control the adjusting value generating unit and the laser beam source driving unit.

16 Claims, 5 Drawing Sheets

APPARATUS AND METHOD FOR CONTROLLING WHITE BALANCE OF LASER DISPLAY SYSTEM

BACKGROUND OF THE DISCLOSURE

1. Field of the Disclosure

The present invention relates to laser display systems, and more particularly to device and method for adjusting white balance in a laser display system, which enables to adjust white balance taking an optical characteristic of a laser beam into account.

2. Discussion of the Related Art

In general, the laser display system, such as a laser projector and a laser projection, for showing a picture by projecting an image signal onto a screen by using a laser beam from a laser beam source, is used for having presentation in a meeting room, and as a projector in a theater, a domestic home theater, and so on, mostly.

The laser display system uses red, green, and blue laser diode as the laser beam sources.

The laser diode used as the laser beam source can adjust laser beam output intensity with a current applied thereto.

In general, the laser diode has intensity of the current at which the laser beam output intensity increases sharply, called as a threshold current Ith, and starts oscillation at a current level exceeding the threshold current Ith.

However, the laser diode is liable to have the laser beam output intensity variable with a temperature characteristic of the laser diode.

That is, even if the same current is applied to the laser diode, the laser beam output intensity of the laser diode can vary with temperatures.

Figure 1:
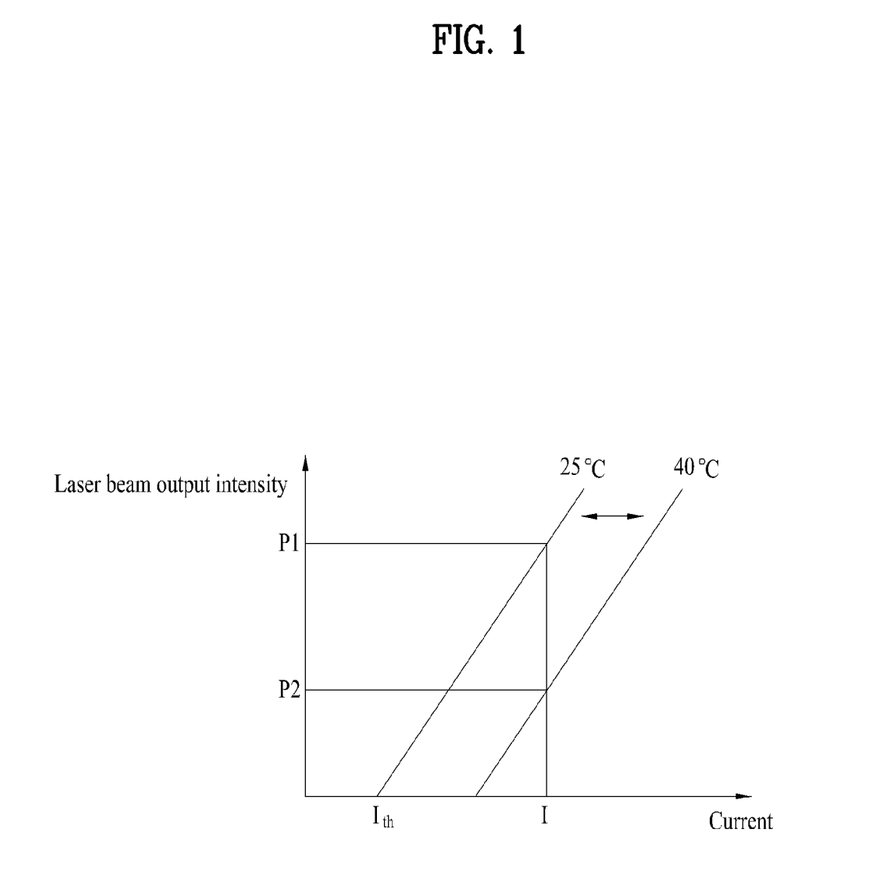
FIG. 1 illustrates a graph showing a relation of a temperature versus variation of laser beam output intensity of a laser diode.

FIG. 1 illustrates a graph showing a relation of a temperature versus variation of laser beam output intensity of a laser diode, wherein it can be known that a functional relation between the laser beam output intensity and the current increases or decreases with the temperatures.

For an example, if the present temperature changes from 25° C. to 40° C., the laser beam output intensity of the laser diode changes from P1 to P2 even if the same intensity of current is applied to the laser diode.

If the laser beam output intensity varies thus, proper white balance of the image being displayed can not be provided, causing a serious problem of providing an image of poor picture quality to a user.

Consequently, development of a system which can adjusts the white balance is required taking the characteristic of the laser diode into account in the future.

SUMMARY OF THE DISCLOSURE

Accordingly, the present invention is directed to device and method for adjusting white balance in a laser display system.

An object of the present invention is to provide device and method for adjusting white balance in a laser display system, which can adjust white balance automatically taking a characteristic of the laser diode of which laser beam output intensity varies with temperatures into account.

Another object of the present invention is to provide device and method for adjusting white balance in a laser display system, which can adjust white balance automatically taking variation of a wave length with laser beam output intensity at the same temperature into account.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for adjusting white balance in a laser display system having red, green, and blue laser beam sources, includes the steps of sensing the present temperature, searching for an allowable current range corresponding to the present temperature sensed thus, applying a current value within the allowable current range searched thus to a relevant laser beam source to measure laser beam output intensity, comparing a measured value of the laser beam output intensity measured thus to the reference values on the laser beam output intensity at the different temperatures, to generate an adjusting value, and adjusting the laser beam output intensity of the relevant laser beam source according to the adjusting value generated thus.

In this instance, the step of applying a current value within the allowable current range searched thus to a relevant laser beam source to measure laser beam output intensity includes the steps of determining priorities of an order of the red, green, and blue laser beam sources for adjusting the laser beam output intensity thereof, and applying the current value within the allowable current range searched thus to the laser beam source having the highest priority according to the order of priorities determined thus, to measure the laser beam output intensity.

And, the step of comparing a measured value of the laser beam output intensity measured thus to the reference values on the laser beam output intensity at the different temperatures, to generate an adjusting value includes the steps of multiplying basic laser beam output intensity of a relevant laser beam source to a basic color ratio for the white balance to generate a resultant value, and adding or subtracting a difference value between the measured value and the reference value to/from the resultant value, thereby generating the adjusting value.

Then, the method, after the step of adjusting the laser beam output intensity of the relevant laser beam source according to the adjusting value generated thus, further includes the steps of determining whether the laser beam output intensity of all of the red, green, and blue laser beam sources is adjusted or not, sensing the present temperature, if yes as a result of the determination, searching the stored reference values for the laser beam output intensity corresponding to the present temperature sensed thus if the present temperature sensed thus is different from a prior temperature, and adjusting the laser beam output intensity of the relevant laser beam source according to the laser beam output intensity searched thus.

And, the method further includes the steps of determining whether the relevant laser beam source has variation of a wave length with the laser beam output intensity at the same temperature, and if yes, as a result of the determination, re-adjusting the adjusting value generated thus from the wave length information at different laser beam output intensity at the same temperature, before the step of adjusting the laser beam output intensity of the relevant laser beam source according to the adjusting value generated thus.

In another aspect of the present invention, a method for adjusting white balance in a laser display system, having red, green, and blue laser beam sources, includes the steps of sensing the present temperature, searching for an allowable current range corresponding to the present temperature sensed thus, applying a current value within the allowable current range searched thus to a relevant laser beam source to measure laser beam output intensity, comparing a measured value of the laser beam output intensity measured thus to first reference values on the laser beam output intensity at the different temperatures, to generate a first adjusting value, comparing the first adjusting value to the wave length information on the different laser beam output intensity at the same temperature, to generate a second adjusting value, and adjusting the laser beam output intensity of the relevant laser beam source according to the second adjusting value generated thus.

In another aspect of the present invention, a device for adjusting white balance in a laser display system having red, green, and blue laser beam sources, includes a temperature sensing unit for sensing the present temperatures of the laser beam sources, a detecting unit for measuring laser beam output intensity of the laser beam sources, a storing unit for storing reference values on allowable current ranges at different temperatures and laser beam output intensity at different temperatures, an adjusting value generating unit for comparing a measured value of the laser beam output intensity obtained from the detecting unit to the reference values obtained from the storing unit, to generate an adjusting value, a laser beam source driving unit for adjusting the laser beam output intensity of a relevant laser beam source according to a current value within the allowable current range or the adjusting value generated thus, and a control unit for searching the storing unit for the allowable current range corresponding to the present temperature sensed thus, or the reference value corresponding to the laser beam output intensity measured thus to control the adjusting value generating unit and the laser beam source driving unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 2:
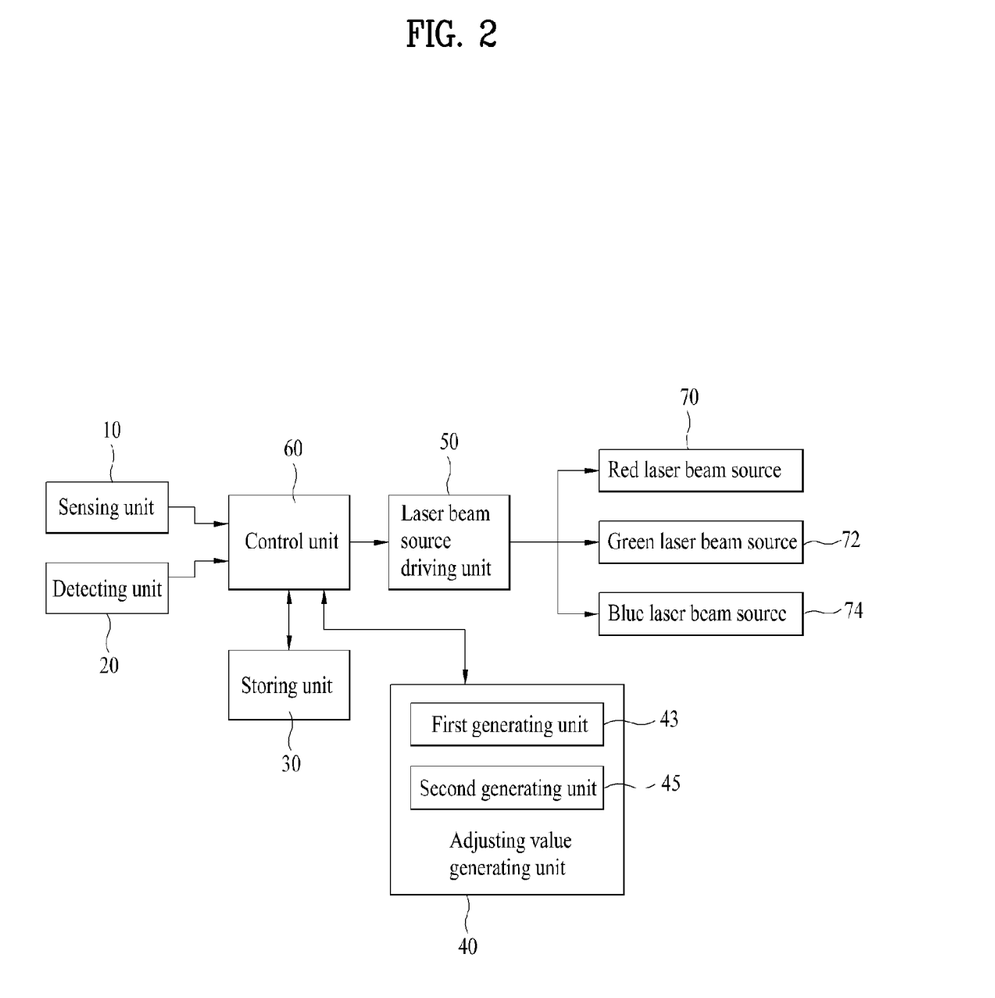
FIG. 2 illustrates a block diagram of a device for adjusting white balance in accordance with a preferred embodiment of the present invention.

FIG. 2 illustrates a block diagram of a device for adjusting white balance in accordance with a preferred embodiment of the present invention, including a temperature sensing unit 10, a detecting unit 20, a storing unit 30, an adjusting value generating unit 40, a laser beam source driving unit 50, and a control unit 60.

In this instance, the adjusting value generating unit 40 can include a first generating unit 43 and a second generating unit 45.

The temperature sensing unit 10 serves to sense a present temperature of the laser beam source, and the detecting unit 20, a photo diode, serves to measure laser beam output intensity of the laser beam source.

And, the storing unit 30 has reference values on allowable ranges of currents at different temperatures, and laser beam output intensity at different temperatures stored therein, and, depending on cases, also has reference values on wave length information on different laser beam output intensity at the same temperature, stored therein, additionally.

In this instance, each of the reference values on allowable ranges of currents at different temperatures is a limitation on a maximum current allowable to apply to the laser beam source at a temperature, representing an allowable range between a threshold current of a laser beam source to be used to a maximum current value.

The maximum current value is limited thus for minimizing power consumption required for adjusting the white balance.

If the maximum current value is not limited, large power consumption required for adjusting the white balance is liable to impede performance of other functions, if a capacity of a battery of the system presently used is small.

Accordingly, the allowable range of a current at a temperature can vary with the battery capacity of the system used.

For an example, if the device for adjusting white balance of the present invention is applied to a cellular phone, the allowable current range at a temperature can be preset to suit to the battery capacity of the cellular phone.

And, the reference values on the laser beam output intensity at different temperatures is setting of optimum laser beam output intensity at the different temperatures as reference values taking laser beam output intensity varied with temperatures into account, in advance.

And, each of the reference values on wave length information on different laser beam output intensity at the same temperature is the laser beam output intensity set in advance as a reference value which can compensate for the variation of the wave lengths taking a characteristic of the laser beam, in which the wave length varies with the laser beam output intensity at the same temperature, into account.

Next, the adjusting value generating unit 40 serves to compare a measured value of the laser beam output intensity obtained from the detecting unit 20 to the reference values obtained from the storing unit 30, for generating an adjusting value.

In this instance, the first generating unit 43 of the adjusting value generating unit 40 can compare a measured value of the laser beam output intensity obtained from the detecting unit 20 to reference values on the laser beam output intensity at the different temperatures obtained from the storing unit 30, to generate a first adjusting value, and the second generating unit 45 of the adjusting value generating unit 40 can compare the first adjusting value obtained from the first generating unit 43 to the reference values on wave length information on different laser beam output intensity at the same temperature to generate a second adjusting value.

In this instance, the first adjusting value is a value generated by multiplying basic laser beam output intensity of a relevant laser beam source to a basic color ratio of the white balance to generate a resultant value and adding or subtracting a difference value between the measured value and the reference value to/from the resultant value.

That is, a relational expression for generating the first adjusting value is as follows.

$$\text{White}=aR+bG+cB=a(R\pm x)+b(G\pm y)+c(B\pm z)$$

Where, R, G, B are the basic laser beam output intensity, a, b, c are the basic color ratio values of the white balance, and x, y, z are difference values between the measured values and the reference values, of red, green and blue laser beams, respectively.

And, in the present invention, it is required to re-adjust the first adjusting value by using the first adjusting value generated thus taking variation of the wave length with the laser beam output intensity at the same temperature into account.

Figure 3:
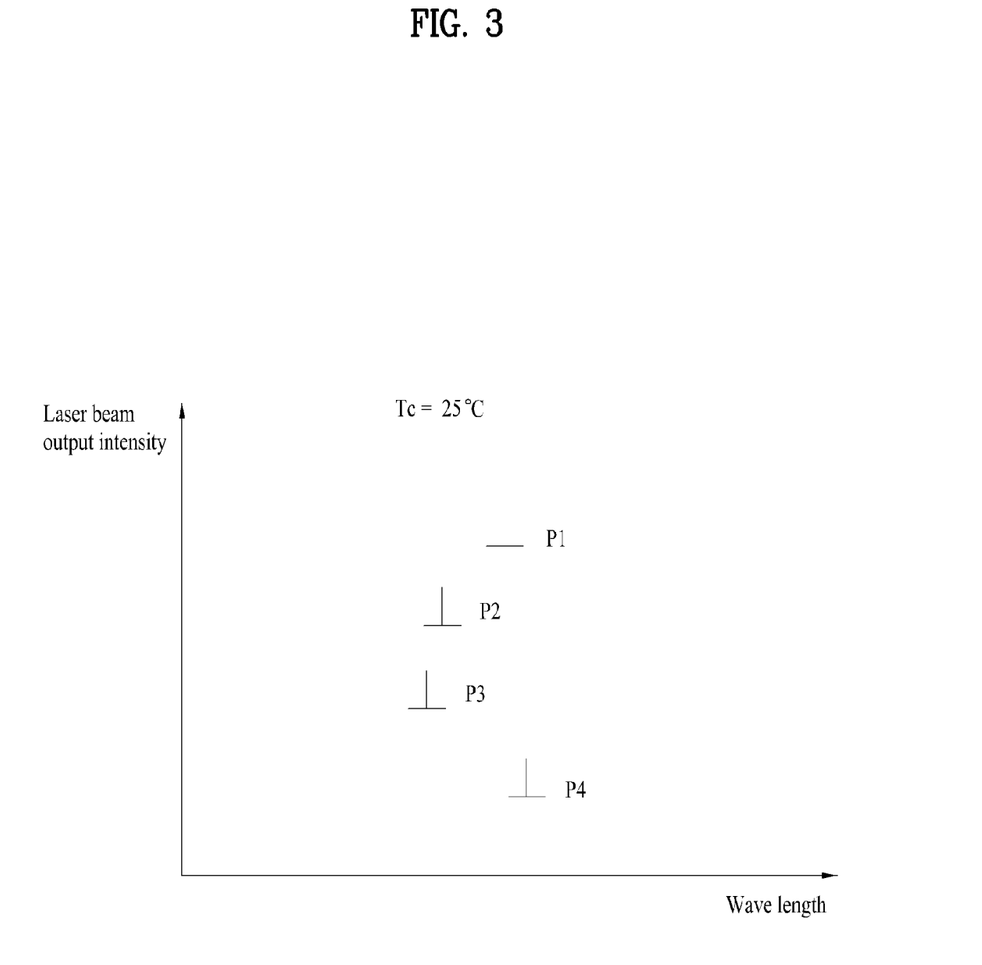
FIG. 3 illustrates a graph showing laser beam output intensity versus a wave length varied with the laser beam output intensity at the same temperature.

Referring to FIG. 3, this is because the laser beam has the wave length varied with the laser beam output intensity at the same temperature owing to a nature of the laser beam.

Therefore, the second generating unit 45 of the adjusting value generating unit 40 serves to re-adjust the first adjusting value taking such variation of the wave length into account, to generate the second adjusting value.

Then, the laser beam source driving unit 50 serves to adjust the laser beam output intensity of a relevant laser beam according to a current value within the allowable current range or the adjusted value generated thus.

And, the control unit 60 can search the storing unit 30 for the allowable current range for the present temperature sensed thus, and can control the laser beam source driving unit 50 according to the current value within the allowable current range searched thus to adjust the laser beam output intensity.

The control unit 60 can control the laser beam source driving unit 50 to extract only predetermined current values from current values within the allowable current range searched thus and to apply the current values extracted thus to the laser beam source in succession.

That is, the control unit 60 can control the laser beam source driving unit 50 to apply current values to the laser beam source within the allowable current range while varying the current values in N steps of gradients by using the current values extracted thus.

The control unit 60 extracts the predetermined current values thus for minimizing an adjusting time period required for adjusting the white balance.

Because much unnecessary time is required for adjusting the white balance if entire current values are used without extracting the predetermined current values.

And, the control unit 60 controls the adjusting value generating unit 40 to search the storing unit 30 for a reference value corresponding to the laser beam output intensity measured thus, and to generate an adjusting value for adjusting the laser beam output intensity for the white balance by using the reference value searched thus.

Moreover, the control unit 60 can also determine priorities for adjusting the laser beam output intensity of the red, green, blue laser beam sources 70, 72, and 74 in response to a signal applied by the user, or the priorities for adjusting the laser beam output intensity can be set in the system in advance.

If the priorities for adjusting the laser beam output intensity are to be set in advance, it is preferable that the blue laser beam source 74 has a highest priority and the red laser beam source 70 has a lowest priority.

Accordingly, it is preferable that the present invention adjusts the laser beam output intensity in an order of the blue laser beam source 74, the green laser beam source 72, and the red laser beam source 70 for adjusting the white balance.

A method for adjusting white balance in accordance with a preferred embodiment of the present invention will be described with reference to FIG. 4.

Figure 4:
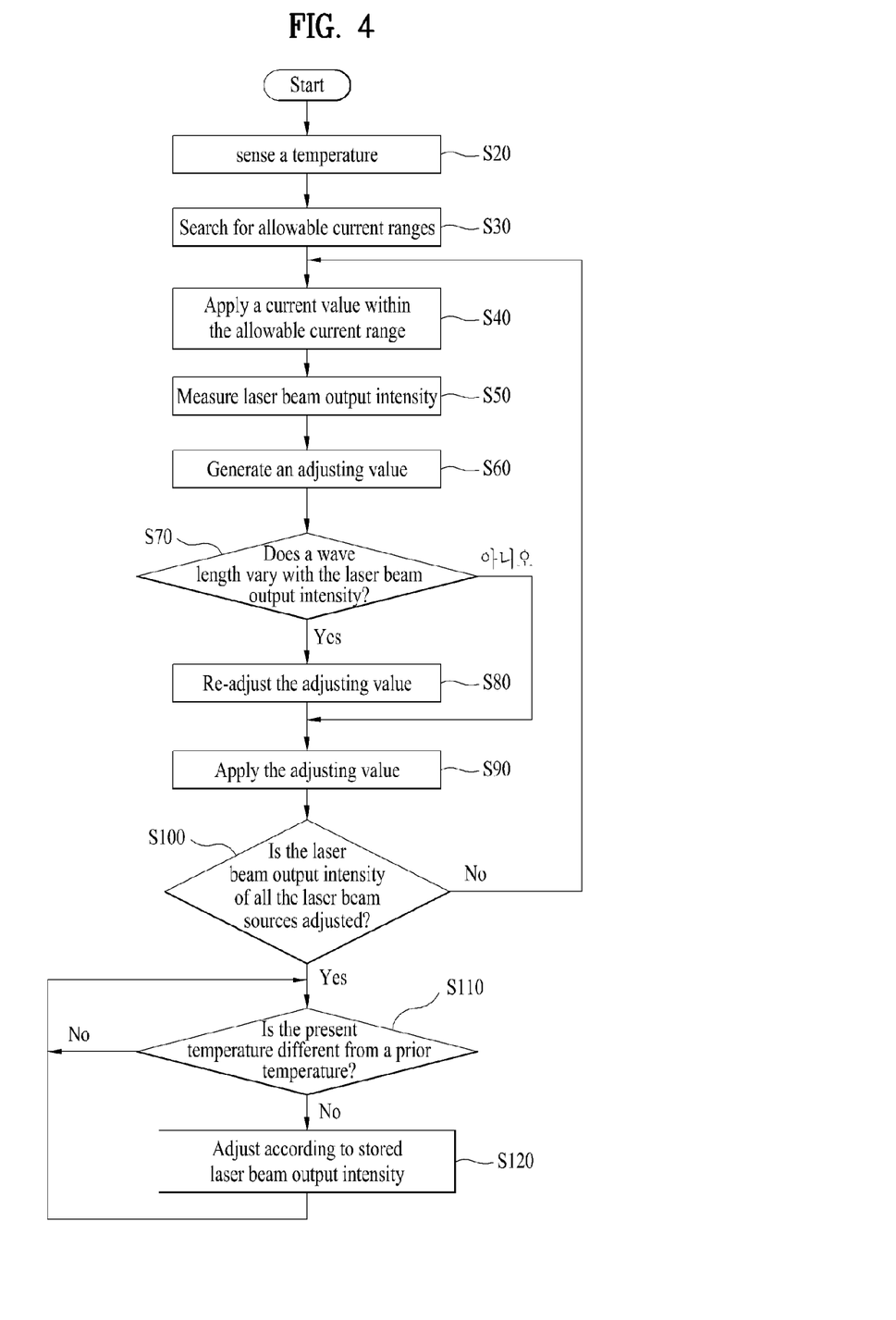
FIG. 4 illustrates a flow chart showing the steps of a method for adjusting white balance in accordance with a first preferred embodiment of the present invention.

FIG. 4 illustrates a flow chart showing the steps of a method for adjusting white balance in accordance with a first preferred embodiment of the present invention.

Referring to FIG. 4, reference values on allowable current ranges at different temperatures and laser beam output intensity at different temperatures are set and stored in a storing unit 30.

Depending on cases, the reference values can be stored in the storing unit 30 including reference values on wave length information on different laser beam output intensity at the same temperature, further.

Then, when a temperature sensing unit 10 senses the present temperature of the laser beam source (S20), the control unit 60 searches the storing unit 30 for allowable current range corresponding to the present temperature sensed thus (S30). In this instance, the allowable current range can vary with a battery capacity applied to the system.

In this instance, the allowable current range can vary with a battery capacity applicable to the system.

Each of the allowable current ranges at the different temperatures limits a maximum current value applicable to the laser beam source according to a temperature, representing between a threshold current to a maximum current value of the laser beam source.

The maximum current value is limited thus for minimizing power consumption required for adjusting the white balance.

If the maximum current value is not limited, large power consumption required for adjusting the white balance is liable to impede performance of other functions, if a capacity of a battery of the system presently used is small.

Then, the control unit 60 determines priorities for adjusting the laser beam output intensity of the red, green, and blue laser beam sources 70, 72, and 74.

Depending on cases, this step can be omitted.

In this instance, the priorities can be set in advance at the system, or set by application of the user.

It is the most preferable that the priorities are set in an order of the blue laser beam source 74, the green laser beam source 72, and the red laser beam source 70.

And, the control unit 60 controls a laser beam source driving unit 50 to apply a current value within the allowable current range searched thus to the laser beam source having the highest priority according to the priorities determined thus (S40).

In this instance, the control unit 60 controls the laser beam source driving unit 50 to apply a current value to the laser beam source while varying the current value in N steps of gradients within the allowable current range.

That is, the control unit 60 can control the laser beam source driving unit 50 to apply the current while varying the current in N steps of gradients within the allowable current range by using extracted current values.

The control unit 60 extracts the predetermined current values thus for minimizing an adjusting time period for adjusting the white balance.

Because much unnecessary time is consumed for adjusting the white balance if entire current values within the allowable current range are used without extracting the predetermined current values.

Then, the detecting unit 20 measures the laser beam output intensity of a relevant laser beam source (S50).

Next, in response to a control signal from the control unit 60, a first generating unit 43 of an adjusting value generating unit 40 compares a measured value of the laser beam output intensity measured thus to the reference values on the laser beam output intensity at different temperatures, to generate an adjusting value (S60).

In this instance, the adjusting value is a value generated by multiplying basic laser beam output intensity of a relevant laser beam source to a basic color ratio of the white balance to generate a resultant value and adding or subtracting a difference value between the measured value and the reference value to/from the resultant value.

That is, a relational expression for generating the adjusting value is as follows.

$$White = aR + bG + cB = a(R \pm x) + b(G \pm y) + c(B \pm z)$$

Where, R, G, B are the basic laser beam output intensity, a, b, c are the basic color ratio values for the white balance, and x, y, z are difference values between the measured values and the reference values, of the red, green and blue laser beams, respectively.

Then, the control unit 60 determines whether a relevant laser beam source has variation of a wave length with the laser beam output intensity at the same temperature or not (S70), and, if yes as a result of determination, the second adjusting unit 45 of the adjusting value generating unit 40 re-adjusts the adjusting value generated thus with reference to the wave length information on the laser beam output intensity at the same temperature according to a control signal from the control unit 60 (80).

In this instance, the re-adjustment of the adjusted value can be made only for some of the laser beam sources, such as the red laser beam source which has a greatest wave length variation at different laser beam output intensity at the same temperature, or for all the red, green, and blue laser beam sources.

Then, the laser beam source driving unit 50 adjusts the laser beam output intensity of the relevant laser beam source according to the adjusting value generated thus, to adjust the white balance (S90).

Then, the control unit 60 determines whether the laser beam output intensity of all the red, green, and blue laser beam sources 70, 72, and 74 are adjusted (S100) or not, and, if not as a result of the determination, the control unit 60 controls the laser beam source driving unit 50, again.

Next, according to a control signal from the control unit 60, the laser beam source driving unit 50 applies a current value within the allowable current range searched thus to a next priority laser beam source, and the detecting unit 20 measures the laser beam output intensity of the laser beam source, and repeats steps thereafter.

However, as a result of the determination, if the control unit 60 has adjusted the laser beam output intensity of all the red, green, and blue laser beam sources 70, 72, and 74, the control unit 60 determines whether the present temperature sensed at the sensing unit 10 is different from a prior temperature or not (S110).

If different as a result of the determination, the control unit 60 searches the stored references values for the laser beam output intensity corresponding to the present temperature sensed thus, and controls the laser beam source driving unit 50 according to the laser beam output intensity searched thus to adjust relevant laser beam output intensity, to adjust the white balance, automatically (S120).

However, if the present temperature sensed thus is the same with the prior temperature as a result of the determination, the control unit 60 repeats the S110 step while maintaining the present white balance.

Figure 5:
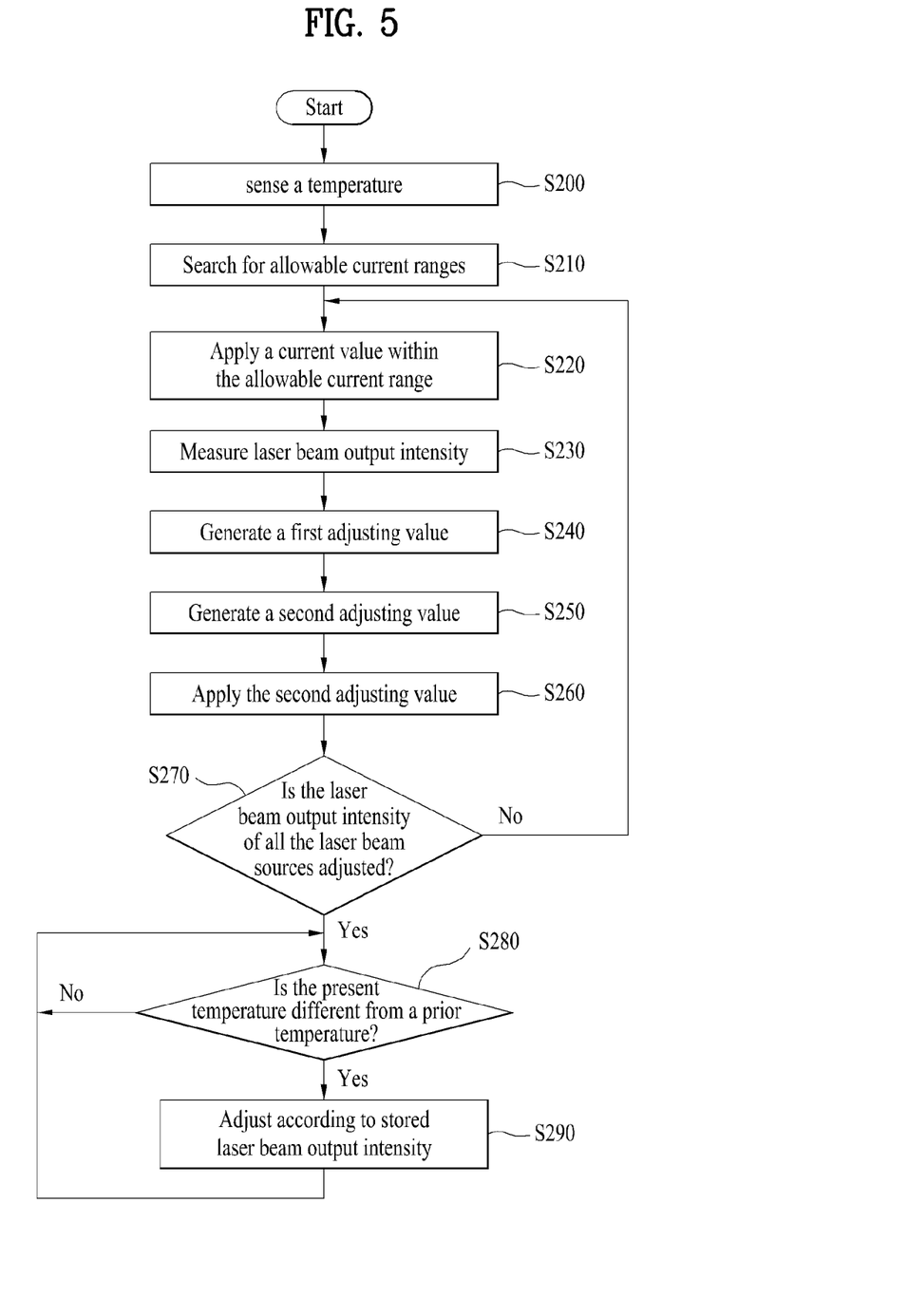
FIG. 5 illustrates a flow chart showing the steps of a method for adjusting white balance in accordance with a second preferred embodiment of the present invention.

FIG. 5 illustrates a flow chart showing the steps of a method for adjusting white balance in accordance with a second preferred embodiment of the present invention.

Referring to FIG. 5, first reference values on allowable current ranges at different temperatures and laser beam output intensity at different temperatures and second reference values on wave length information on different laser beam output intensity at the same temperature are set and stored in the storing unit 30.

Then, when a temperature sensing unit 10 senses the present temperature of the laser beam source (S200), the control unit 60 searches the storing unit 30 for a allowable current range corresponding to the present temperature sensed thus (S210).

In this instance, the allowable current range can vary with a battery capacity applied to the system.

Each of the allowable current ranges at different temperatures limits a maximum current value applicable to the laser beam source at a temperature, representing an allowable range from a threshold current to a maximum current value of the laser beam source.

The maximum current values are limited thus for minimizing power consumption required for adjusting the white balance.

If the maximum current values are not limited, large power consumption required for adjusting the white balance is liable to impede performance of other functions of a system, if a capacity of a battery of the system presently used is small.

Then, the control unit 60 determines priorities for adjusting the laser beam output intensity of the red, green, and blue laser beam sources 70, 72, and 74.

Depending on cases, this step can be omitted.

In this instance, the priorities can be set in advance at the system, or set by application of the user.

It is the most preferable that the priorities are set in an order of the blue laser beam source 74, the green laser beam source 72, and the red laser beam source 70.

And, the control unit 60 controls a laser beam source driving unit 50 to apply a current value within the allowable current range searched thus to the laser beam source having a highest priority according to the priorities determined thus (S220).

In this instance, the control unit 60 controls the laser beam source driving unit 50 to apply a current value to the laser beam source while varying the current value in N steps of gradients within the allowable current range.

That is, the control unit 60 can control the laser beam source driving unit 50 to apply the current while varying the current in N steps of gradients within the allowable current range by using extracted current values.

The control unit 60 extracts the predetermined current values thus for minimizing an adjusting time period for adjusting the white balance.

Because a much unnecessary time period will be consumed for adjusting the white balance if entire current values within the allowable current range are used without extracting the predetermined current values.

Then, the detecting unit 20 measures the laser beam output intensity of a relevant laser beam source (S230).

Next, according to a control signal from the control unit 60, a first generating unit 43 of an adjusting value generating unit 40 compares a measured value of the laser beam output intensity measured thus to the reference values on the laser beam output intensity at the different temperatures, to generate a first adjusting value (S240).

In this instance, the first adjusting value is a value generated by multiplying basic laser beam output intensity of a relevant laser beam source to a basic color ratio of the white balance to generate a resultant value and adding or subtracting a difference value between the measured value and the reference value to/from the resultant value.

That is, a relational expression for generating the first adjusting value is as follows.

$$White = aR + bG + cB = a(R \pm x) + b(G \pm y) + c(B \pm z)$$

Where, R, G, B are the basic laser beam output intensity, a, b, c are the basic color ratio values of the white balance, and x, y, z are difference values between the measured values and the reference values, of the red, green and blue laser beams, respectively.

Then, a second generating unit 45 of the adjusting value generating unit 40 re-adjusts the first adjusting value generated thus with reference to the wave length information on the different laser beam output intensity at the same temperature according to a control signal from the control unit 60, to generate a second adjusting value (S250).

In this instance, the second adjusting value is generated by re-adjusting the first adjusting value for taking a wave length variation with the laser beam output intensity at the same temperature into account.

Then, the laser beam source driving unit 50 adjusts the laser beam output intensity of the relevant laser beam source according to the second adjusting value generated thus, to adjust the white balance (S260).

And, the control unit 60 determines whether the laser beam output intensity of all of the red, green, and blue laser beam sources 70, 72, and 74 are adjusted (S270) or not, and, if not as a result of the determination, the control unit 60 controls the laser beam source driving unit 50, again.

Next, according to a control signal from the control unit 60, the laser beam source driving unit 50 applies a current value within the allowable current range searched thus to a next priority laser beam source, and the detecting unit 20 measures the laser beam output intensity of the laser beam source, and repeats steps thereafter.

However, as a result of the determination, if the control unit 60 has adjusted the laser beam output intensity of all the red, green, and blue laser beam sources 70, 72, and 74, the control unit 60 determines whether the present temperature sensed at the sensing unit 10 is different from a prior temperature or not (S280).

If different as a result of the determination, the control unit 60 searches the stored references values for the laser beam output intensity corresponding to the present temperature sensed thus, and controls the laser beam source driving unit 50 according to the laser beam output intensity searched thus to adjust the laser beam output intensity of a relevant laser beam source, to adjust the white balance, automatically (S290).

However, if the present temperature sensed thus is the same with the prior temperature as a result of the determination, the control unit 60 repeats the S290 step while maintaining the present white balance.

As have been described, the device and method for adjusting white balance in a laser display system have the following advantages.

The present invention can adjust the white balance automatically by comparing the reference value in which variation of the laser beam output intensity with temperatures is taken into account to a value measured by using a photodiode and the temperature sensor, and adjusting the laser beam output intensity of each of the laser beam sources.

Moreover, the present invention can provide a best picture quality to the user by adjusting the laser beam output intensity of the laser beam source with a value which is a re-adjusted value, of a value adjusted taking the variation of the laser beam output intensity with the temperatures into account, taking the variation of the wave length with the laser beam output intensity at the same temperature into account, permitting a fine adjustment of the white balance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A device for adjusting white balance in a laser display system, having red, green, and blue laser beam sources, comprising:
   a temperature sensing unit for sensing the present temperatures of the laser beam sources;
   a detecting unit for measuring laser beam output intensity of the laser beam sources;
   a storing unit for storing reference values on allowable current ranges at different temperatures and laser beam output intensity at different temperatures, and reference values on wave length information on different laser beam output intensity at the same temperature;
   an adjusting value generating unit for comparing a measured value of the laser beam output intensity obtained from the detecting unit to the reference values obtained from the storing unit, to generate an adjusting value;
   a laser beam source driving unit for adjusting the laser beam output intensity of a relevant laser beam source according to a current value within the allowable current range or the adjusting value generated thus; and
   a control unit for searching the storing unit for the allowable current range corresponding to the present temperature sensed thus, or the reference value corresponding to the laser beam output intensity measured thus to control the adjusting value generating unit and the laser beam source driving unit,
   wherein the adjusting value generated from the adjusting value generating unit is calculated by the following equation,
   the adjusting value=$aR+bG+cB+=a(R\pm x)+b(C\pm y)+c(B\pm z)$, where, R, G, B are the basic laser beam output intensity, a, b, c are the basic color ratio values for the white balance, and x, y, z are difference values between the measured values and the reference values, of red, green and blue laser beams, respectively.

2. The device as claimed in claim 1, wherein the control unit determines priorities for adjusting the laser beam output intensity of the red, green, and blue laser beam sources according to a signal applied by a user.

3. The device as claimed in claim 1, wherein the adjusting value generating unit includes
   a first generating unit for comparing the measured value of the laser beam output intensity obtained from the detecting unit to reference values obtained from the storing unit on the laser beam output intensity at the different temperatures, to generate a first adjusting value, and a second generating unit for comparing the first adjusting value obtained from the first generating unit to the reference values on wave length information on the different laser beam output intensity at the same temperature, to generate a second adjusting value.

4. The device as claimed in claim 1, wherein the control unit controls the laser beam source driving unit such that the laser beam output intensity is adjusted in an order of the blue laser beam source, the green laser beam source, and the red laser beam source.

5. A method for adjusting white balance in a laser display system, having red, green, and blue laser beam sources, comprising the steps of:
- sensing the present temperature;
- searching for an allowable current range corresponding to the present temperature sensed thus;
- applying a current value within the allowable current range searched thus to a relevant laser beam source to measure laser beam output intensity;
- comparing a measured value of the laser beam output intensity measured thus to the reference values on the laser beam output intensity at the different temperatures, to generate an adjusting value; and
- adjusting the laser beam output intensity of the relevant laser beam source according to the adjusting value generated thus, wherein the allowable current range varies with a battery capacity applied to the system,
- wherein the adjusting value is calculated by the following equation,
- the adjusting value=aR+bG+cB=a(R±x)+b(G±y)+c(B±z), where, R, G, B are the basic laser beam output intensity, a, b, c are the basic color ratio values for the white balance, and x, y, z are difference values between the measured values and the reference values, of red, green and blue laser beams, respectively.

6. The method as claimed in claim 5, wherein the step of applying a current value within the allowable current range searched thus to a relevant laser beam source to measure laser beam output intensity includes the step of applying the current value while varying the current value in N steps of gradients within the allowable current range.

7. The method as claimed in claim 5, wherein the step of applying a current value within the allowable current range searched thus to a relevant laser beam source to measure laser beam output intensity includes the steps of
- determining priorities of an order of the red, green, and blue laser beam sources for adjusting the laser beam output intensity thereof, and
- applying the current value within the allowable current range searched thus to the laser beam source having the highest priority according to the order of priorities determined thus, to measure the laser beam output intensity.

8. The method as claimed in claim 7, wherein the laser beam source having the highest priority is the blue laser beam source, and the laser beam source having a lowest priority is the red laser beam source.

9. The method as claimed in claim 5, after the step of adjusting the laser beam output intensity of the relevant laser beam source according to the adjusting value generated thus, further comprising the steps of:
- determining whether the laser beam output intensity of all of the red, green, and blue laser beam sources is adjusted or not;
- sensing the present temperature, if yes as a result of the determination;
- searching the stored reference values for the laser beam output intensity corresponding to the present temperature sensed thus if the present temperature sensed thus is different from a prior temperature; and
- adjusting the laser beam output intensity of the relevant laser beam source according to the laser beam output intensity searched thus.

10. The method as claimed in claim 9, after the step of determining whether the laser beam output intensity of all of the red, green, and blue laser beam sources is adjusted or not, further comprising the steps of:
- applying a current value within the allowable current range searched thus to rest of the laser beam sources to measure the laser beam output intensity thereof; and
- repeating steps thereafter, if not as the result of the determination.

11. The method as claimed in claim 5, further comprising the steps of:
- determining whether the relevant laser beam source has variation of a wave length with the laser beam output intensity at the same temperature; and
- if yes, as a result of the determination, re-adjusting the adjusting value generated thus from the wave length information at different laser beam output intensity at the same temperature, before the step of adjusting the laser beam output intensity of the relevant laser beam source according to the adjusting value generated thus.

12. The method as claimed in claim 11, wherein the laser beam source having variation of a wave length at the different laser beam output intensity at the same temperature is the red laser beam source.

13. A method for adjusting white balance in a laser display system, having red, green, and blue laser beam sources, comprising the steps of:
- sensing the present temperature;
- searching for an allowable current range corresponding to the present temperature sensed thus;
- applying a current value within the allowable current range searched thus to a relevant laser beam source to measure laser beam output intensity;
- comparing a measured value of the laser beam output intensity measured thus to first reference values on the laser beam output intensity at the different temperatures, to generate a first adjusting value;
- comparing the first adjusting value to the wave length information on the different laser beam output intensity at the same temperature, to generate a second adjusting value; and
- adjusting the laser beam output intensity of the relevant laser beam source according to the second adjusting value generated thus,
- wherein the first adjusting value is calculated by the following equation,
- the first adjusting value=aR+bG+cB=a(R+x)+b(G±y)+c(B±z), where, R, G, B are the basic laser beam output intensity, a, b, c are the basic color ratio values for the white balance, and x, y, z are difference values between the measured values and the reference values, of red, green and blue laser beams, respectively.

14. The method as claimed in claim 13, wherein the step of applying a current value within the allowable current range searched thus to a relevant laser beam source to measure laser beam output intensity includes the steps of
- determining priorities of an order of the red, green, and blue laser beam sources for adjusting the laser beam output intensity thereof, and
- applying the current value within the allowable current range searched thus to the laser beam source having the highest priority according to the order of priorities determined thus, to measure the laser beam output intensity.

15. The method as claimed in claim 13, after the step of adjusting the laser beam output intensity of the relevant laser beam source according to the second adjusting value generated thus, further comprising the steps of:
- determining whether the laser beam output intensity of all of the red, green, and blue laser beam sources is adjusted or not;
- sensing the present temperature, if yes as a result of the determination;
- searching the stored first reference values for the laser beam output intensity corresponding to the present temperature sensed thus if the present temperature sensed thus is different from a prior temperature; and
- adjusting the laser beam output intensity of the relevant laser beam source according to the laser beam output intensity searched thus.

16. The method as claimed in claim 15, after the step of determining whether the laser beam output intensity of all of the red, green, and blue laser beam sources is adjusted or not, further comprising the steps of:
- applying a current value within the allowable current range searched thus to rest of the laser beam sources to measure the laser beam output intensity thereof; and
- repeating steps thereafter, if not, as the result of the determination.

* * * * *